United States Patent
Wang et al.

(10) Patent No.: US 11,388,722 B2
(45) Date of Patent: Jul. 12, 2022

(54) COMMON DOWNLINK CONTROL CHANNEL TRANSMISSION METHOD AND DEVICE

(71) Applicant: CHINA ACADEMY OF TELECOMMUNICATIONS TECHNOLOGY, Beijing (CN)

(72) Inventors: Lei Wang, Beijing (CN); Tony Ekpenyong, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 286 days.

(21) Appl. No.: 16/622,873

(22) PCT Filed: Jun. 13, 2018

(86) PCT No.: PCT/CN2018/091065
§ 371 (c)(1),
(2) Date: Dec. 13, 2019

(87) PCT Pub. No.: WO2018/228433
PCT Pub. Date: Dec. 20, 2018

(65) Prior Publication Data
US 2020/0214014 A1 Jul. 2, 2020

(30) Foreign Application Priority Data
Jun. 16, 2017 (CN) .......................... 201710457783.X

(51) Int. Cl.
*H04W 72/04* (2009.01)
*H04W 56/00* (2009.01)
(Continued)

(52) U.S. Cl.
CPC ....... *H04W 72/0493* (2013.01); *H04L 5/0007* (2013.01); *H04W 56/001* (2013.01);
(Continued)

(58) Field of Classification Search
CPC .......... H04W 72/0493; H04W 72/042; H04W 72/0446; H04W 72/0453; H04W 72/046;
(Continued)

(56) References Cited

U.S. PATENT DOCUMENTS

2013/0195065 A1  8/2013  Park
2015/0208408 A1  7/2015  Berggren et al.
2016/0150510 A1  5/2016  Shao et al.

FOREIGN PATENT DOCUMENTS

CN    103181109 A    6/2013
CN    104025489 A    9/2014
(Continued)

OTHER PUBLICATIONS

R1-1707340, Intel Corp., 'Remaining system information delivery mechanisms', 3GPP TSG RAN WG1 Meeting RAN1 #89, May 15-19, 2017, pp. 1-4. (Year: 2017).*
(Continued)

*Primary Examiner* — Melvin C Marcelo
(74) *Attorney, Agent, or Firm* — Ladas & Parry, LLP

(57) ABSTRACT

A common downlink control channel transmission method and a relevant device are provided. The common downlink control channel transmission method includes: receiving, by a UE, a target signal from a network side device, a resource set for transmitting a common downlink control channel is associated with the target signal; and determining, by the UE, the resource set in accordance with the target signal, and receiving the common downlink control channel from the network side device through the resource set.

18 Claims, 5 Drawing Sheets

(51) Int. Cl.
*H04L 5/00* (2006.01)
*H04W 74/08* (2009.01)

(52) U.S. Cl.
CPC ....... *H04W 72/042* (2013.01); *H04W 72/046* (2013.01); *H04W 72/0446* (2013.01); *H04W 72/0453* (2013.01); *H04W 74/0833* (2013.01)

(58) Field of Classification Search
CPC ............ H04W 56/001; H04W 74/0833; H04L 5/0007
See application file for complete search history.

(56) References Cited

FOREIGN PATENT DOCUMENTS

| CN | 104521168 A | 4/2015 | |
|---|---|---|---|
| CN | 104541471 A | 4/2015 | |
| CN | 106549745 A | 3/2017 | |
| WO | 2015013959 A1 | 2/2015 | |
| WO | 2018106043 A1 | 6/2018 | |
| WO | WO 2021/221922 A1 * | 11/2021 | ............... H04L 5/00 |

OTHER PUBLICATIONS

First Office Action and search report from CN app. No. 201710457783.X, dated Mar. 20, 2020, with English translation from Global Dossier.
Extended European Search Report from EP app. No. 18817012.0, dated May 6, 2020.
First Office Action from TW app. No. 107120316, dated Apr. 15, 2020, with machine English translation.
International Search Report from PCT/CN2018/091065, dated Sep. 5, 2018, with English translation from WIPO.
Written Opinion of the International Searching Authority from PCT/CN2018/091065, dated Sep. 5, 2018, with English translation from WIPO.
International Preliminary Report on Patentability from PCT/CN2018/091065, dated Dec. 17, 2019, with English translation from WIPO.
"3rd Generation Partnership Project; Technical Specification Group Radio Access Network; Study on New Radio Access Technology Physical Layer Aspects (Release 14)" 3GPP TR 38.802 V14.0.0, Mar. 2017.
"Search space design consideration for NR PDCCH with BF", R1-1704618, 3GPP TSG RAN WG1 Meeting #88bis, Spokane, Washington, USA, Apr. 3-7, 2017.
"Remaining system information delivery consideration", R1-1705569, 3GPP TSG RAN WG1 Meeting #88bis, Spokane, Washington, USA, Apr. 3-7, 2017.
"Configuration of control resource set", R1-1706943, 3GPP TSG RAN WG1 Meeting #89, Hangzhou, China, May 15-19, 2017.
"Impact on common channel reception to PDCCH design", R1-1707709, 3GPP TSG RAN WG1 Meeting #89, Hangzhou, China, May 15-19, 2017.
"Remaining system information delivery", R1-1707930, 3GPP TSG RAN WG1 Meeting #89, Hangzhou, China, May 15-19, 2017.
"Common control resource set signaling in MIB", R1-1708611, 3GPP TSG RAN WG1 Meeting #89, Hangzhou, China, May 15-19, 2017.
"Remaining details on remaining minimum system information delivery", R1-1715910, 3GPP TSG RAN WG1 Meeting NR#3, Nagoya, Japan, Sep. 18-21, 2017.
Notification of Reason for Refusal from KR app. No. 10-2020-7001217, dated Jan. 20, 2021, with English translation from Global Dossier.
"Remaining minimum system information", R1-1704362, 3GPP TSG RAN WG1 Meeting #88bis, Spokane, USA, Apr. 3-7, 2017.
"4-step RACH procedure", R1-1707933, 3GPP TSG RAN WG1 Meeting #89, Hangzhou, China, May 15-19, 2017.
"NR delivery of remaining system information", R1-1708723, 3GPP TSG-RAN WG1 Meeting #89, Hangzhou, May 15-19, 2017, all pages.
Notification of Reason for Refusal from KR app. No. 10-2020-7001217, dated Jul. 16, 2021, with English translation provided by Global Dossier, all pages.
Notice of Reason for Refusal from JP app. No. 2019-569439, dated Apr. 27, 2021, with English translation provided by Global Dossier.
"Remaining system information delivery mechanisms", R1-1707340, 3GPP TSG RAN WG1 Meeting RAN1 #89, Hangzhou, P.R. China, May 15-19, 2017.
"Configuration aspects of the NR-PDCCH", R1-1707497, 3GPP TSG RAN WG1 Meeting RAN1 #89, Hangzhou, P.R. China, May 15-19, 2017.

* cited by examiner

COMMON DOWNLINK CONTROL CHANNEL TRANSMISSION METHOD AND DEVICE

CROSS-REFERENCE TO RELATED APPLICATIONS

The present application is the U.S. national phase of PCT Application No. PCT/CN2018/091065 filed on Jun. 13, 2018, which claims a priority of to the Chinese patent application No. 201710457783.X filed on Jun. 16, 2017, the disclosures of which are incorporated herein by reference in their entireties.

TECHNICAL FIELD

The present disclosure relates to the field of communication technology, in particular to a common downlink control channel transmission method and a relevant device.

BACKGROUND

In a Long Term Evolution (LTE) system, a common downlink control channel is transmitted within a Common Search Space (CSS) in a control area. In addition, the common downlink control channel is transmitted by a network side device using an omnidirectional antenna, and all user equipments (UEs) belonging to the network side device may detect and receive the common downlink control channel in any direction. Because the common downlink control channel is merely transmitted within the CSS, it is unnecessary to notify the common downlink control channel through additional signaling. Hence, the transmission of the common downlink control channel has insufficient flexibility.

SUMMARY

An object of the present disclosure is to provide a common downlink control channel transmission method and a relevant device, so as to improve the transmission flexibility of the common downlink control channel.

In one aspect, the present disclosure provides in some embodiments a common downlink control channel transmission method, including: receiving, by a UE, a target signal from a network side device, wherein a resource set for transmitting a common downlink control channel is associated with the target signal; and determining, by the UE, the resource set in accordance with the target signal, and receiving the common downlink control channel from the network side device through the resource set.

In a possible embodiment of the present disclosure, the target signal includes a synchronization signal block.

In a possible embodiment of the present disclosure, an Orthogonal Frequency Division Multiplexing (OFDM) symbol occupied by the resource set is the same as an OFDM symbol occupied by the synchronization signal block, and a transmission periodicity of the common downlink control channel is the same as a transmission periodicity of the synchronization signal block.

In a possible embodiment of the present disclosure, a time-frequency-domain resource occupied by the resource set and a time-frequency-domain resource occupied by the synchronization signal block are used in a Frequency Division Multiplexing (FDM) manner.

In a possible embodiment of the present disclosure, the common downlink control channel and the synchronization signal block are transmitted on a same OFDM symbol using a same beam.

In a possible embodiment of the present disclosure, all contents of configuration information of the resource set are predefined in a protocol, or partial or all contents of the configuration information of the resource set are configured through a Master Information Block (MIB) in the synchronization signal block.

In a possible embodiment of the present disclosure, the configuration information of the resource set includes one or more of a mapping relationship between Control Channel Elements (CCEs) and Resource Element Groups (REGs), a mapping relationship between Physical Downlink Control Channel (PDCCH) candidate resources and the CCEs, information about a Demodulation Reference Signal (DMRS) port mode, information about how many resources are occupied, and a resource offset relative to the synchronization signal block.

In a possible embodiment of the present disclosure, the configuration information of the resource set is determined through the synchronization signal block and/or predefined in a protocol.

In a possible embodiment of the present disclosure, one synchronization signal block corresponds to at least one resource set for transmitting the common downlink control channel. The configuration information is indicated explicitly and/or implicitly indicated through the MIB in the synchronization signal block, or there is a relationship between the configuration information and the synchronization signal block predefined in a protocol.

In a possible embodiment of the present disclosure, a time-frequency-domain position of the at least one resource set for transmitting the common downlink control channel corresponding to the synchronization signal block is notified through the MIB in one synchronization signal block.

In a possible embodiment of the present disclosure, one synchronization signal block corresponds to at least one time-frequency-domain position of the at least one resource set for transmitting the common downlink control channel. One synchronization signal block is located within a same slot as the at least one resource set for transmitting the common downlink control channel corresponding to the synchronization signal block, and the at least one resource set for transmitting the common downlink control channel is located before the synchronization signal block; or one synchronization signal block is located within a same slot as the at least one resource set for transmitting the common downlink control channel corresponding to the synchronization signal block, and the at least one resource set for transmitting the common downlink control channel is located after the synchronization signal block; one synchronization signal block is located within on a same OFDM symbol within a same slot as the at least one resource set for transmitting the common downlink control channel corresponding to the synchronization signal block; or the at least one resource set for transmitting the common downlink control channel corresponding to one synchronization signal block is located within one or more slots other than a slot within which the synchronization signal block is transmitted; or one synchronization signal block occupies a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block is notified through the MIB in the synchronization signal block or predefined in a protocol.

In a possible embodiment of the present disclosure, a beam for the transmission of the common downlink control channel is the same as a beam for the transmission of the corresponding synchronization signal block, or the beam for the transmission of the common downlink control channel is indicated through the MIB in the corresponding synchronization signal block.

In a possible embodiment of the present disclosure, partial or all the contents in the configuration information of the resource set are indicated through the MIB in the synchronization signal block in the form of table indices, and the table indices are indices in configuration information table predefined in a protocol; or partial the contents in the configuration information are notified through the MIB in the synchronization signal block, and the remaining contents in the configuration information are predefined in a protocol.

In a possible embodiment of the present disclosure, the table indices are used to indicate combinations of partial or all contents in the configuration information, or partial or all contents in the configuration information.

In a possible embodiment of the present disclosure, the target signal is used to configure partial or all contents in the configuration information of the resource set.

In a possible embodiment of the present disclosure, the target signal includes Remaining System Information (RMSI), a message 2 in a random access process, or a message 4 in the random access process.

In a possible embodiment of the present disclosure, relevant parameters of the beam for transmitting the common downlink control channel on the resource set are determined in accordance with a Quasi-Co-Location (QCL) parameter of the synchronization signal block corresponding to the resource set.

In another aspect, the present disclosure provides in some embodiments a common downlink control channel transmission method, including: transmitting, by a network side device, a target signal to a UE, a resource set for transmitting a common downlink control channel being associated with the target signal; and transmitting, by the network side device, the common downlink control channel to the UE through the resource set.

In a possible embodiment of the present disclosure, the target signal includes a synchronization signal block.

In a possible embodiment of the present disclosure, an OFDM symbol occupied by the resource set is the same as an OFDM symbol occupied by the synchronization signal block, and a transmission periodicity of the common downlink control channel is the same as a transmission periodicity of the synchronization signal block.

In a possible embodiment of the present disclosure, a time-frequency-domain resource occupied by the resource set and a time-frequency-domain resource occupied by the synchronization signal block are used in an FDM manner.

In a possible embodiment of the present disclosure, the common downlink control channel and the synchronization signal block are transmitted on a same OFDM symbol using a same beam.

In a possible embodiment of the present disclosure, all contents of configuration information of the resource set are predefined in a protocol, or partial or all contents of the configuration information of the resource set are configured through an MIB in the synchronization signal block.

In a possible embodiment of the present disclosure, the configuration information of the resource set includes one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set is determined through the synchronization signal block and/or predefined in a protocol.

In a possible embodiment of the present disclosure, one synchronization signal block corresponds to at least one resource set for transmitting the common downlink control channel. The configuration information is indicated explicitly and/or implicitly indicated through the MIB in the synchronization signal block, or there is a relationship between the configuration information and the synchronization signal block predefined in a protocol.

In a possible embodiment of the present disclosure, a time-frequency-domain position of the at least one resource set for transmitting the common downlink control channel corresponding to the synchronization signal block is notified through the MIB in one synchronization signal block.

In a possible embodiment of the present disclosure, one synchronization signal block corresponds to at least one time-frequency-domain position of the at least one resource set for transmitting the common downlink control channel. One synchronization signal block is located within a same slot as the at least one resource set for transmitting the common downlink control channel corresponding to the synchronization signal block, and the at least one resource set for transmitting the common downlink control channel is located before the synchronization signal block; or one synchronization signal block is located within a same slot as the at least one resource set for transmitting the common downlink control channel corresponding to the synchronization signal block, and the at least one resource set for transmitting the common downlink control channel is located after the synchronization signal block; one synchronization signal block is located within on a same OFDM symbol within a same slot as the at least one resource set for transmitting the common downlink control channel corresponding to the synchronization signal block; or the at least one resource set for transmitting the common downlink control channel corresponding to one synchronization signal block is located within one or more slots other than a slot within which the synchronization signal block is transmitted; or one synchronization signal block occupies a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block is notified through the MIB in the synchronization signal block or predefined in a protocol.

In a possible embodiment of the present disclosure, a beam for the transmission of the common downlink control channel is the same as a beam for the transmission of the corresponding synchronization signal block, or the beam for the transmission of the common downlink control channel is indicated through the MIB in the corresponding synchronization signal block.

In a possible embodiment of the present disclosure, partial or all the contents in the configuration information of the resource set are indicated through the MIB in the synchronization signal block in the form of table indicates, and the table indices are indices in configuration information table predefined in a protocol; or partial the contents in the configuration information are notified through the MIB in the synchronization signal block, and the remaining contents in the configuration information are predefined in a protocol.

In a possible embodiment of the present disclosure, the table indices are used to index combinations of partial or all contents in the configuration information, or index partial or all contents in the configuration information.

In a possible embodiment of the present disclosure, the target signal is used to configure partial or all contents in the configuration information of the resource set.

In a possible embodiment of the present disclosure, the target signal includes RMSI, a message 2 in a random access process, or a message 4 in the random access process.

In a possible embodiment of the present disclosure, relevant parameters of the beam for transmitting the common downlink control channel on the resource set are determined in accordance with a QCL parameter of the synchronization signal block corresponding to the resource set.

In yet another aspect, the present disclosure provides in some embodiments a UE, including: a reception module configured to receive a target signal from a network side device, a resource set for transmitting a common downlink control channel being associated with the target signal; and a determination module configured to determine the resource set in accordance with the target signal, and receive the common downlink control channel from the network side device through the resource set.

In a possible embodiment of the present disclosure, the target signal includes a synchronization signal block.

In a possible embodiment of the present disclosure, an OFDM symbol occupied by the resource set is the same as an OFDM symbol occupied by the synchronization signal block, and a transmission periodicity of the common downlink control channel is the same as a transmission periodicity of the synchronization signal block.

In a possible embodiment of the present disclosure, a time-frequency-domain resource occupied by the resource set and a time-frequency-domain resource occupied by the synchronization signal block are used in an FDM manner.

In a possible embodiment of the present disclosure, the common downlink control channel and the synchronization signal block are transmitted on a same OFDM symbol using a same beam.

In a possible embodiment of the present disclosure, all contents of configuration information of the resource set are predefined in a protocol, or partial or all contents of the configuration information of the resource set are configured through an MIB in the synchronization signal block.

In a possible embodiment of the present disclosure, the configuration information of the resource set includes one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set is determined through the synchronization signal block and/or predefined in a protocol.

In a possible embodiment of the present disclosure, one synchronization signal block corresponds to at least one resource set for transmitting the common downlink control channel. The configuration information is indicated explicitly and/or implicitly indicated through the MIB in the synchronization signal block, or there is a relationship between the configuration information and the synchronization signal block predefined in a protocol.

In a possible embodiment of the present disclosure, a time-frequency-domain position of the at least one resource set for transmitting the common downlink control channel corresponding to the synchronization signal block is notified through the MIB in one synchronization signal block.

In a possible embodiment of the present disclosure, one synchronization signal block corresponds to at least one time-frequency-domain position of the at least one resource set for transmitting the common downlink control channel. One synchronization signal block is located within a same slot as the at least one resource set for transmitting the common downlink control channel corresponding to the synchronization signal block, and the at least one resource set for transmitting the common downlink control channel is located before the synchronization signal block; or one synchronization signal block is located within a same slot as the at least one resource set for transmitting the common downlink control channel corresponding to the synchronization signal block, and the at least one resource set for transmitting the common downlink control channel is located after the synchronization signal block; one synchronization signal block is located within on a same OFDM symbol within a same slot as the at least one resource set for transmitting the common downlink control channel corresponding to the synchronization signal block; or the at least one resource set for transmitting the common downlink control channel corresponding to one synchronization signal block is located within one or more slots other than a slot within which the synchronization signal block is transmitted; or one synchronization signal block occupies a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block is notified through the MIB in the synchronization signal block or predefined in a protocol.

In a possible embodiment of the present disclosure, a beam for the transmission of the common downlink control channel is the same as a beam for the transmission of the corresponding synchronization signal block, or the beam for the transmission of the common downlink control channel is indicated through the MIB in the corresponding synchronization signal block.

In a possible embodiment of the present disclosure, partial or all the contents in the configuration information of the resource set are indicated through the MIB in the synchronization signal block in the form of table indicates, and the table indices are indices in configuration information table predefined in a protocol; or partial the contents in the configuration information are notified through the MIB in the synchronization signal block, and the remaining contents in the configuration information are predefined in a protocol.

In a possible embodiment of the present disclosure, the table indices are used to index combinations of partial or all contents in the configuration information, or index partial or all contents in the configuration information.

In a possible embodiment of the present disclosure, the target signal is used to configure partial or all contents in the configuration information of the resource set.

In a possible embodiment of the present disclosure, the target signal includes (RMSI, a message 2 in a random access process, or a message 4 in the random access process.

In a possible embodiment of the present disclosure, relevant parameters of the beam for transmitting the common downlink control channel on the resource set are determined in accordance with a QCL parameter of the synchronization signal block corresponding to the resource set.

In still yet another aspect, the present disclosure provides in some embodiments a network side device, including: a first transmission module configured to transmit a target signal to a UE, a resource set for transmitting a common downlink control channel being associated with the target signal; and a second transmission module configured to transmit the common downlink control channel to the UE through the resource set.

In a possible embodiment of the present disclosure, the target signal includes a synchronization signal block.

In a possible embodiment of the present disclosure, an OFDM symbol occupied by the resource set is the same as an OFDM symbol occupied by the synchronization signal block, and a transmission periodicity of the common downlink control channel is the same as a transmission periodicity of the synchronization signal block.

In a possible embodiment of the present disclosure, a time-frequency-domain resource occupied by the resource set and a time-frequency-domain resource occupied by the synchronization signal block are used in an FDM manner.

In a possible embodiment of the present disclosure, the common downlink control channel and the synchronization signal block are transmitted on a same OFDM symbol using a same beam.

In a possible embodiment of the present disclosure, all contents of configuration information of the resource set are predefined in a protocol, or partial or all contents of the configuration information of the resource set are configured through an MIB in the synchronization signal block.

In a possible embodiment of the present disclosure, the configuration information of the resource set includes one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set is determined through the synchronization signal block and/or predefined in a protocol.

In a possible embodiment of the present disclosure, one synchronization signal block corresponds to at least one resource set for transmitting the common downlink control channel. The configuration information is indicated explicitly and/or implicitly indicated through the MIB in the synchronization signal block, or there is a relationship between the configuration information and the synchronization signal block predefined in a protocol.

In a possible embodiment of the present disclosure, a time-frequency-domain position of the at least one resource set for transmitting the common downlink control channel corresponding to the synchronization signal block is notified through the MIB in one synchronization signal block.

In a possible embodiment of the present disclosure, one synchronization signal block corresponds to at least one time-frequency-domain position of the at least one resource set for transmitting the common downlink control channel. One synchronization signal block is located within a same slot as the at least one resource set for transmitting the common downlink control channel corresponding to the synchronization signal block, and the at least one resource set for transmitting the common downlink control channel is located before the synchronization signal block; or one synchronization signal block is located within a same slot as the at least one resource set for transmitting the common downlink control channel corresponding to the synchronization signal block, and the at least one resource set for transmitting the common downlink control channel is located after the synchronization signal block; one synchronization signal block is located within on a same OFDM symbol within a same slot as the at least one resource set for transmitting the common downlink control channel corresponding to the synchronization signal block; or the at least one resource set for transmitting the common downlink control channel corresponding to one synchronization signal block is located within one or more slots other than a slot within which the synchronization signal block is transmitted; or one synchronization signal block occupies a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block is notified through the MIB in the synchronization signal block or predefined in a protocol.

In a possible embodiment of the present disclosure, a beam for the transmission of the common downlink control channel is the same as a beam for the transmission of the corresponding synchronization signal block, or the beam for the transmission of the common downlink control channel is indicated through the MIB in the corresponding synchronization signal block.

In a possible embodiment of the present disclosure, partial or all the contents in the configuration information of the resource set are indicated through the MIB in the synchronization signal block in the form of table indicates, and the table indices are indices in configuration information table predefined in a protocol; or partial the contents in the configuration information are notified through the MIB in the synchronization signal block, and the remaining contents in the configuration information are predefined in a protocol.

In a possible embodiment of the present disclosure, the table indices are used to index combinations of partial or all contents in the configuration information, or index partial or all contents in the configuration information.

In a possible embodiment of the present disclosure, the target signal is used to configure partial or all contents in the configuration information of the resource set.

In a possible embodiment of the present disclosure, the target signal includes RMSI, a message 2 in a random access process, or a message 4 in the random access process.

In a possible embodiment of the present disclosure, relevant parameters of the beam for transmitting the common downlink control channel on the resource set are determined in accordance with a QCL parameter of the synchronization signal block corresponding to the resource set.

In still yet another aspect, the present disclosure provides in some embodiments a UE, including a processor, a transceiver, a memory, a user interface and a bus interface. The processor is configured to read a program stored in the memory, so as to: receive through the transceiver a target signal from a network side device, a resource set for transmitting a common downlink control channel being associated with the target signal; and determine the resource set in accordance with the target signal, and receive through the transceiver the common downlink control channel from the network side device through the resource set.

In still yet another aspect, the present disclosure provides in some embodiments a network side device, including a processor, a transceiver, a memory, a user interface and a bus interface. The processor is configured to read a program stored in the memory, so as to: transmit through the transceiver a target signal to a UE, a resource set for transmitting a common downlink control channel being associated with the target signal; and transmit through the transceiver the common downlink control channel to the UE through the resource set.

In still yet another aspect, the present disclosure provides in some embodiments a computer-readable storage medium storing therein a computer program. The computer program is executed by a processor so as to: receive a target signal from a network side device, a resource set for transmitting a common downlink control channel being associated with the target signal; and determine the resource set in accordance with the target signal, and receive the common downlink control channel from the network side device through the resource set.

In still yet another aspect, the present disclosure provides in some embodiments a computer-readable storage medium storing therein a computer program. The computer program is executed by a processor so as to: transmit a target signal to a UE, a resource set for transmitting a common downlink control channel being associated with the target signal; and transmit the common downlink control channel to the UE through the resource set.

The present disclosure at least has the following beneficial effect. According to the embodiments of the present disclosure, the UE may receive the target signal from the network side device, and the resource set for transmitting the common downlink control channel may be associated with the target signal. Then, the UE may determine the resource set in accordance with the target signal, and receive the common downlink control channel from the network side device through the resource set. Because the resource set for transmitting the common downlink control channel is associated with the target signal, it is able to flexibly adjust the resource set, thereby to improve the transmission flexibility of the common downlink control channel.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
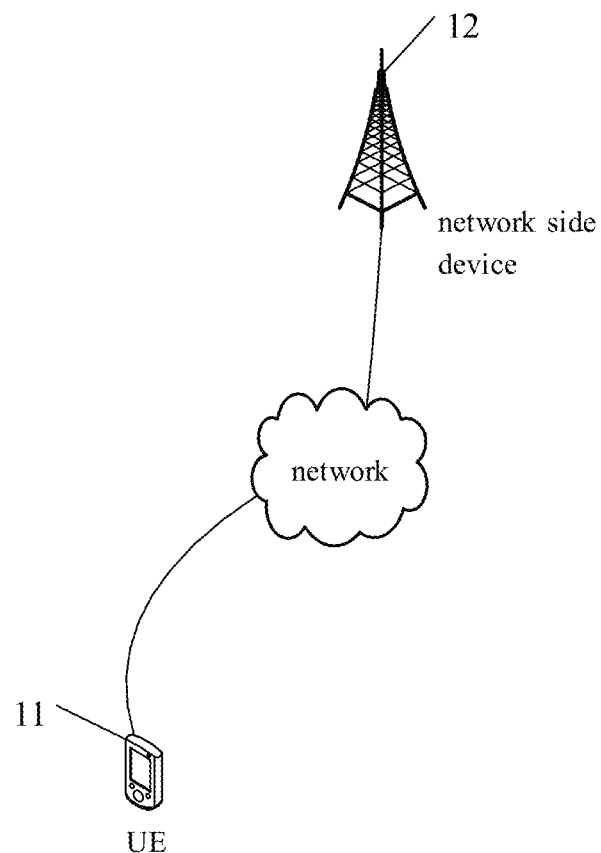
FIG. 1 is a schematic view showing a network according to one embodiment of the present disclosure.

FIG. 1 shows a network in the embodiments of the present disclosure. As shown in FIG. 1, the network includes a UE 11 and a network side device 12. The UE 11 may be a mobile phone, a tablet personal computer, a laptop computer, a Personal Digital Assistant (PDA), a Mobile Internet Device (MID) or a wearable device. It should be appreciated that, the types of the UE 11 will not be particularly defined herein. The network side device 12 may be a base station (e.g., a macro base station, a Long Term Evolution (LTE) evolved Node B (eNB), or a 5th-Generation (5G) New Radio (NR) NB), or a micro base station (e.g., a Low Power Node (LPN) pico base station, or a femto base station), or an Access Point (AP). In addition, the base station may also be a network node consisting of a Central Unit (CU) and a plurality of Transmission Reception Points (TRPs) managed and controlled by the CU. It should be appreciated that, the types of the network side device 12 will not be particularly defined herein.

Figure 2:
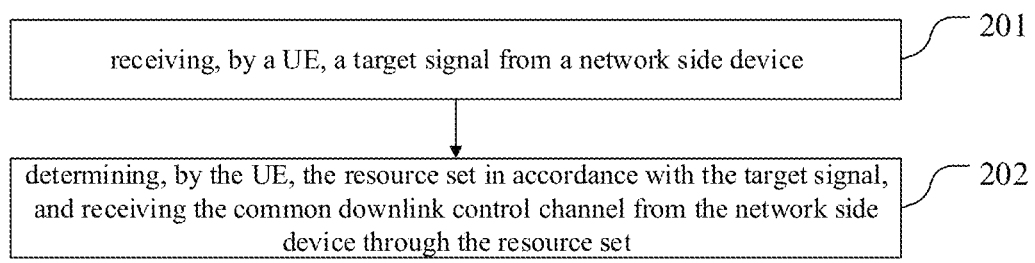
FIG. 2 is a flow chart of a common downlink control channel transmission method according to one embodiment of the present disclosure.

The present disclosure provides in some embodiments a common downlink control channel transmission method which, as shown in FIG. 2, includes: Step 201 of receiving, by a UE, a target signal from a network side device, a resource set for transmitting a common downlink control channel (CORESET) being associated with the target signal; and Step 202 of determining, by the UE, the resource set in accordance with the target signal, and receiving the common downlink control channel from the network side device through the resource set.

The target signal may be a synchronization signal (SS) block, an RMSI, a message 2 (Msg2) in a random access process, or a message 4 (Msg4) in the random access process. The common downlink control channel may be a common PDCCH, and the resource set may be understood as resources for transmitting the common downlink control channel.

In addition, when the resource set is associated with the target signal, it means that there may exist a specific relationship between the resource set and resources occupied by the target signal, or the resource set may be indicated by the target signal, or there may exist a specific relationship between beams used for transmitting the common downlink control channel through the resource set and beams used for transmitting the target signal, or there may exist a specific relationship between the resource set predefined in a protocol and the target signal, which will not be particularly defined herein. In addition, the association of the resource set with the target signal may be further understood as that the UE may determine the resource set in accordance with the target signal.

Upon the receipt of the target signal, the UE may determine the resource set, and then receive the common downlink control channel from the network side device through the resource set. In addition, the UE may determine the resource set in an explicit or implicit manner.

It should be appreciated that, in the method, because the resource set for transmitting the common downlink control channel is associated with the target signal, it is able to flexibly adjust the resource set for transmitting the common downlink control channel in accordance with the target signal, thereby to improve the transmission flexibility of the common downlink control channel. In addition, because the resource set for transmitting the common downlink control channel is associated with the target signal, it is able for the UE to determine the resource set in accordance with the target signal, and receive the common downlink control channel without any necessity to transmit the resource set in an omnidirectional manner nor scan the beams, thereby to reduce the transmission resources as well as the power consumption for the UE and the network side device. Furthermore, it is able to transmit the common downlink control channel through multiple beams.

In a possible embodiment of the present disclosure, the target signal may include an SS block.

During the implementation, the resource set for transmitting the common downlink control channel may be associated with the SS block, so it is able for the UE to determine the resource set for transmitting the common downlink control channel in accordance with the SS block, thereby to reduce the signaling transmission as well as the transmission resources. In addition, the SS block may include a Primary Synchronization Signal (PSS), a Secondary Synchronization Signal (SSS) and a Physical Broadcast Channel (PBCH), and an MIB may be carried by the PBCH.

In a possible embodiment of the present disclosure, an OFDM symbol occupied by the resource set may be the same as an OFDM symbol occupied by the SS block, and a transmission periodicity of the common downlink control channel is the same as a transmission periodicity of the SS block.

During the implementation, the common downlink control channel and the SS block may occupy the same OFDM symbol, so it is able for the UE to directly receive the common downlink control channel on the OFDM symbol on which the SS block is received, thereby to reduce the power consumption for the UE and the network side device while increasing the transmission flexibility of the common downlink control channel (because the times of beam scanning operations may be reduced or even it is unnecessary to perform any beam scanning operation).

In a possible embodiment of the present disclosure, a time-frequency-domain resource occupied by the resource set and a time-frequency-domain resource occupied by the SS block may be used in an FDM manner.

During the implementation, the time-frequency-domain resource occupied by the resource set and the time-frequency-domain resource occupied by the SS block may be used in an FDM manner, i.e., the resource set and the SS block may occupy the same OFDM symbol and different frequency-domain resources in a frequency domain, so as to reduce the network resources.

In a possible embodiment of the present disclosure, the common downlink control channel and the synchronization signal block may be transmitted on a same OFDM symbol using a same beam.

During the implementation, the common downlink control channel and the SS block may be transmitted using the same beam, so it is able to improve the transmission performance of the common downlink control channel. In addition, it is able for the UE to receive the common downlink control channel and the SS block using the same beam, thereby to reduce the time for beam training and beam switching.

In a possible embodiment of the present disclosure, all contents of configuration information of the resource set may be predefined in a protocol, or partial or all contents of the configuration information of the resource set may be configured through an MIB in the SS block.

During the implementation, it is able to predefine the configuration information of the resource set by a protocol, thereby to reduce the signaling overhead. In addition, it is able to configure partial or all contents in the configuration information of the resource set through the MIB, thereby to improve the flexibility of the resource set. After determining the configuration information through the protocol or the MIB, it is able to detect and receive the common downlink control channel in the resource set in accordance with the configuration information.

In a possible embodiment of the present disclosure, the configuration information of the resource set may include one or more of a mapping relationship between CCEs and REGs, a mapping relationship between PDCCH candidate resources and the CCEs, information about a DMRS port mode, information about a resource size, and a resource position relative to the synchronization signal block.

The UE may accurately determine the resource set in accordance with the configuration information, so as to accurately receive the common downlink control channel. In addition, the candidate resources may also be called as candidate positions.

Figure 3:
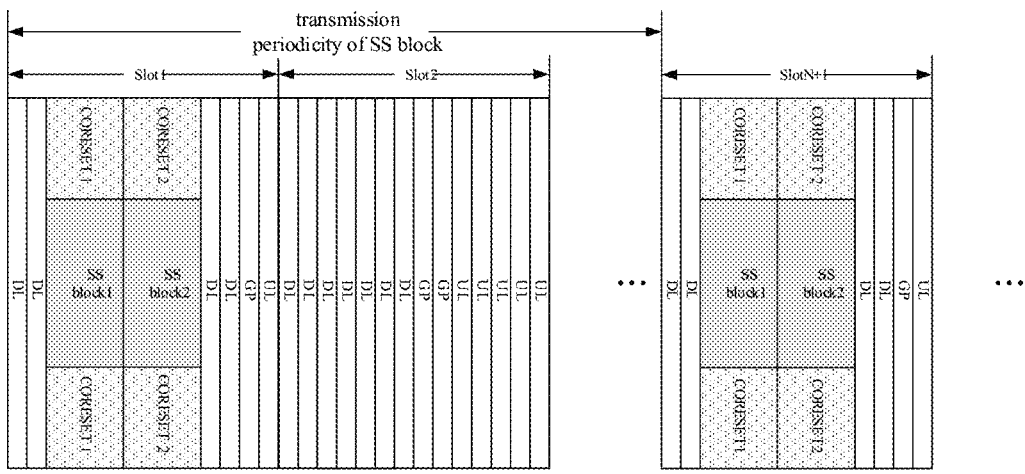
FIG. 3 is a schematic view showing the transmission of a common downlink control channel according to one embodiment of the present disclosure.
Figure 4:
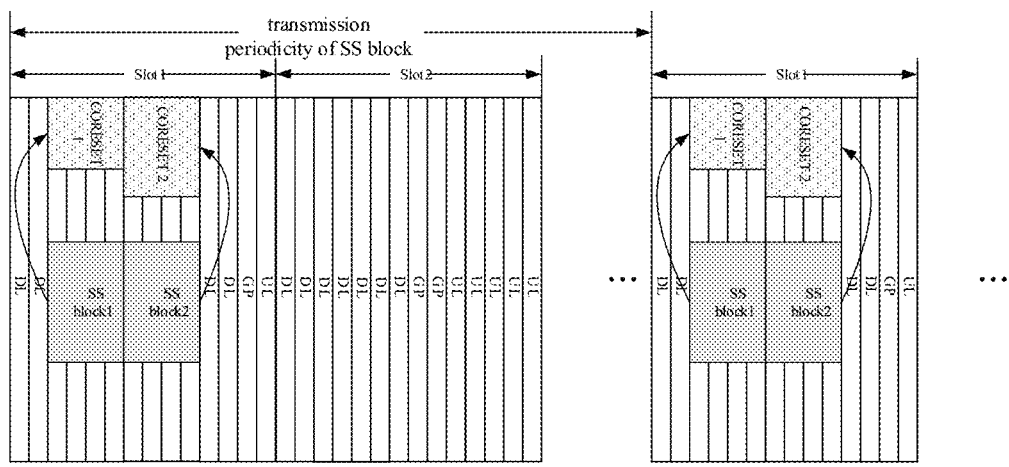
FIG. 4 is another schematic view showing the transmission of the common downlink control channel according to one embodiment of the present disclosure.

FIGS. 3 and 4 show an implementation mode where the OFDM symbol occupied by the resource set is the same as the OFDM symbol occupied by the SS block, and the common downlink control channel is associated with the SS block. The OFDM symbol occupied by the resource set (CORESET) for transmitting the common downlink control channel may be the same as the OFDM symbol occupied by the SS block, and the time-frequency-domain resource occupied by the resource set and the time-frequency-domain resource occupied by the SS block may be used in an FDM manner. A beam direction for transmitting the common downlink control channel may be the same as a beam direction for transmitting the SS block, and a transmission periodicity of the common downlink control channel may also be the same as a transmission periodicity of the SS block. In FIG. 3 or 4, one SS block burst includes 2 SS blocks, the transmission periodicity of each SS block includes 20 slots (i.e., N=20), and a length of each slot includes 14 OFDM symbols. As shown in FIG. 3 or 4, the CORESET for transmitting the common downlink control channel may be located at a same time-domain position as the SS block, but with different frequency-domain positions. A common downlink control channel transmitted within CORESET1 may be transmitted using a same beam as SS block1, a common downlink control channel transmitted within CORESET2 may be transmitted using a same beam as SS block2, and the transmission periodicity of the common downlink control channel may be the same as that of the SS block.

In addition, relevant parameters of the common downlink control channel transmitted within the CORESET, e.g., resource configuration for the CORESET (a fixed size and whether the resources are located at one or both sides of a frequency domain of the SS block), a mapping rule and a DMRS pattern, may be predefined in a protocol.

Alternatively, the configuration information about the CORESET, e.g., a size of a time-frequency-domain resource occupied by the CORESET and an offset value of the resource occupied by the CORESET relative to the resource occupied by the SS block, may be notified in the MIB. In this case, the UE needs to accurately receive the MIB, parse the configuration information about the CORESET, and then detect and receive the common downlink control channel on a same beam as the SS block. At a time-domain position where the SS block occurs, the UE may detect and receive the common downlink control channel using the beam for the corresponding SS block at a resource position configured in accordance with the predefined parameter or notified in the MIB.

In a possible embodiment of the present disclosure, the configuration information of the resource set may be determined through the synchronization signal block and/or predefined in a protocol.

The configuration information may include all or partial the contents in the configuration information mentioned hereinabove, and it may further include time-domain information about the resource set. There may exist a specific relationship between the time-domain information and the time-domain position occupied by the SS block.

During the implementation, the configuration information is determined through the SS block and/or predefined in a protocol, so it is able for the UE to determine the resource set in accordance with the SS block and/or the content predefined in a protocol, thereby to receive the common downlink control channel. In addition, after determining the configuration information through a protocol or the MIB, it is able for the UE to detect and receive the common downlink control channel in the resource set. Further, it is able to determine the resource set in accordance with the configuration information, and detect and receive the common downlink control channel in the resource set.

In a possible embodiment of the present disclosure, one synchronization signal block may correspond to at least one resource set for transmitting the common downlink control channel. The configuration information may be indicated explicitly and/or implicitly indicated through the MIB in the synchronization signal block, or there may exist a relationship predefined in a protocol between the configuration information and the synchronization signal block.

When the configuration information is indicated explicitly through the MIB, the MIB may include indication information indicating the configuration information. For example, a beam-related parameter (QCL parameter) of the SS block may be used to indicate a specific relationship between the DMRSs for the common downlink control channel and the SS blocks, so the UE may determine the resource set in accordance with the SS block. In addition, when the configuration information is indicated implicitly through the MIB, there may exist a predetermined relationship between the configuration information and configuration information about the resources occupied by the MIB. For example, the common downlink control channel may have a same periodicity and use a same beam as the MIB. In other words, the UE may determine the configuration information of the resource set through the MIB, and through the implicit indication, it is able to reduce an overhead for the MIB. The relationship predefined in a protocol between the configuration information and the SS blocks may refer to a relationship predefined in a protocol between the configuration information and the configuration about the resource occupied by the SS block.

During the implementation, the configuration information may be indicated explicitly and/or implicitly through the MIB in the SS block, or there may exist the relationship predefined in a protocol between the configuration information and the SS blocks, so it is able to improve the flexibility of the resource set.

In a possible embodiment of the present disclosure, a time-frequency-domain position of the at least one resource set for transmitting the common downlink control channel corresponding to the synchronization signal block may be notified through the MIB in one synchronization signal block.

During the implementation, the time-frequency-domain position of the resource set may be notified through the MIB, so it is able to improve the flexibility of the common downlink control channel.

In a possible embodiment of the present disclosure, one synchronization signal block may correspond to at least one time-frequency-domain position of the at least one resource set for transmitting the common downlink control channel. One synchronization signal block may be located within a same slot as the at least one resource set for transmitting the common downlink control channel corresponding to the synchronization signal block, and the at least one resource set for transmitting the common downlink control channel may be located before the synchronization signal block; or one synchronization signal block may be located within a same slot as the at least one resource set for transmitting the common downlink control channel corresponding to the synchronization signal block, and the at least one resource set for transmitting the common downlink control channel may be located after the synchronization signal block; one synchronization signal block may be located within on a same OFDM symbol within a same slot as the at least one resource set for transmitting the common downlink control channel corresponding to the synchronization signal block; or the at least one resource set for transmitting the common downlink control channel corresponding to one synchronization signal block may be located within one or more slots other than a slot within which the synchronization signal block is transmitted; or one synchronization signal block may occupy a same frequency-domain resource as the at least one resource set for transmitting the common downlink control channel corresponding to the synchronization signal block.

During the implementation, one SS block may correspond to the time-frequency-domain position of the at least one resource set for transmitting the common downlink control channel, i.e., the UE may determine the time-frequency-domain position of the at least one resource set for transmitting the common downlink control channel in accordance with the SS block, so as to receive at least one common downlink control channel. In addition, it is able to provide a relationship between one SS block and at least one corresponding slot, thereby to further improve the transmission flexibility of the common downlink control channel. It should be appreciated that, the relationship between the SS block and the resource set may be predefined in a protocol, or pre-configured by the UE.

It should be appreciated that, during the implementation, the SS block may occupy the same frequency-domain resource as the resource set in conjunction with a position of the defined slot. For example, the at least one resource set for transmitting the common downlink control channel corresponding to one SS block may be located within one or more slots other than the slot within which the SS block is transmitted, and the one SS block may occupy the same frequency-domain resource as the at least one corresponding resource set for transmitting the common downlink control channel. In addition, when the one SS block occupies the same frequency-domain resource as the at least one corresponding resource set for transmitting the common downlink control channel, it is able to reduce the signaling overhead, because it is unnecessary to indicate the frequency-domain resource occupied by the resource set. The UE may receive the common downlink control channel on a same frequency-domain resource in a corresponding time-domain resource in accordance with the frequency-domain resource through which the SS block is received.

It should be appreciated that, during the implementation, the relationship between the SS block and the at least one resource set for transmitting the common downlink control channel may be notified through the MIB, or predefined in a protocol, which will not be particularly defined herein.

In a possible embodiment of the present disclosure, a periodicity of the at least one resource set for transmitting the common downlink control channel corresponding to one synchronization signal block may be notified through the MIB in the synchronization signal block or predefined in a protocol.

The periodicity of the resource set for transmitting the common downlink control channel may be notified through the MIB or predefined in a protocol, so it is able to further improve the flexibility of the common downlink control channel.

In a possible embodiment of the present disclosure, a beam for the transmission of the common downlink control channel may be the same as a beam for the transmission of the corresponding synchronization signal block, or the beam for the transmission of the common downlink control channel may be indicated through the MIB in the corresponding synchronization signal block.

During the implementation, when the beam for the transmission of the common downlink control channel is the same as the beam for the transmission of the corresponding synchronization signal block, so it is able for the UE to receive the common downlink control channel and the SS block using a same beam, thereby to reduce the times of beam switching operations. In addition, when the beam for the transmission of the common downlink control channel is indicated through the MIB in the corresponding synchronization signal block the SS block and the common downlink control channel may be transmitted using different beams, and received by the UE using different beams, so as to improve the transmission flexibility.

The indication of the resource set (CORESET) for transmitting the common downlink control channel and the relevant parameters through the MIB will be described hereinafter illustratively. The beam for transmitting the common downlink control channel may be the same as, or different from, the beam for transmitting the corresponding SS block. When the beam for transmitting the common downlink control channel is different from that for transmitting the SS block, the resource set and the relevant parameters may be indicated through information carried in the MIB. The resource set (CORESET) for transmitting the common downlink control channel may be located before or after the time-frequency-domain resource occupied by the SS block. When configuring a resource position of the CORESET, the MIB may also configure resources for the CORESET within a slot within which the SS block is transmitted, or within one or more slots other than a slot within which the corresponding SS block is transmitted. Here, one slot may include 14 OFDM symbols, and one SS block may occupy four OFDM symbols.

Figure 5:
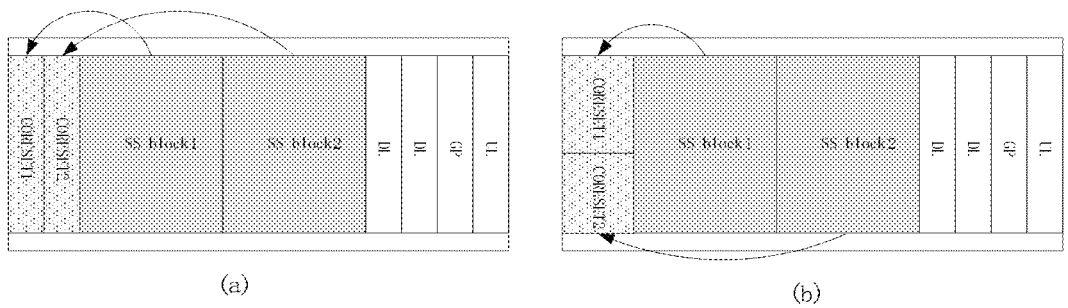
FIG. 5 is yet another schematic view showing the transmission of the common downlink control channel according to one embodiment of the present disclosure.

The CORESET for transmitting the common downlink control channel may be located before the SS block, and at least one CORESET for transmitting the common downlink control channel may be configured through the MIB in one SS block. As shown in FIG. 5, different CORESETs may be used in a Time Division Multiplexing (TDM) or an FDM manner. A beam direction for each CORESET may be the same as, different from, that for the corresponding SS block. Of course, one SS block may corresponding to a plurality of CORESETs for transmitting the downlink control channel, and the CORESETs for transmitting the common downlink control channel may correspond to a same beam direction or different beam directions.

Figure 6:
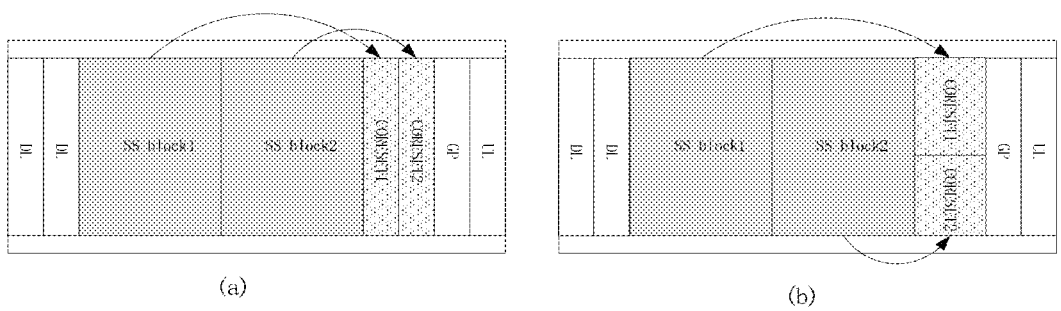
FIG. 6 is still yet another schematic view showing the transmission of the common downlink control channel according to one embodiment of the present disclosure.

In addition, the CORESET for transmitting the common downlink control channel may be located after the SS block, and at least one CORESET for transmitting the common downlink control channel may be configured through the MIB in one SS block. As shown in FIG. 6, different CORESETs may be used in a TDM or an FDM manner. A beam direction for each CORESET may be the same as, different from, that for the corresponding SS block. Of course, one SS block may corresponding to a plurality of CORESETs for transmitting the downlink control channel, and the CORESETs for transmitting the common downlink control channel may correspond to a same beam direction or different beam directions.

Figure 7:
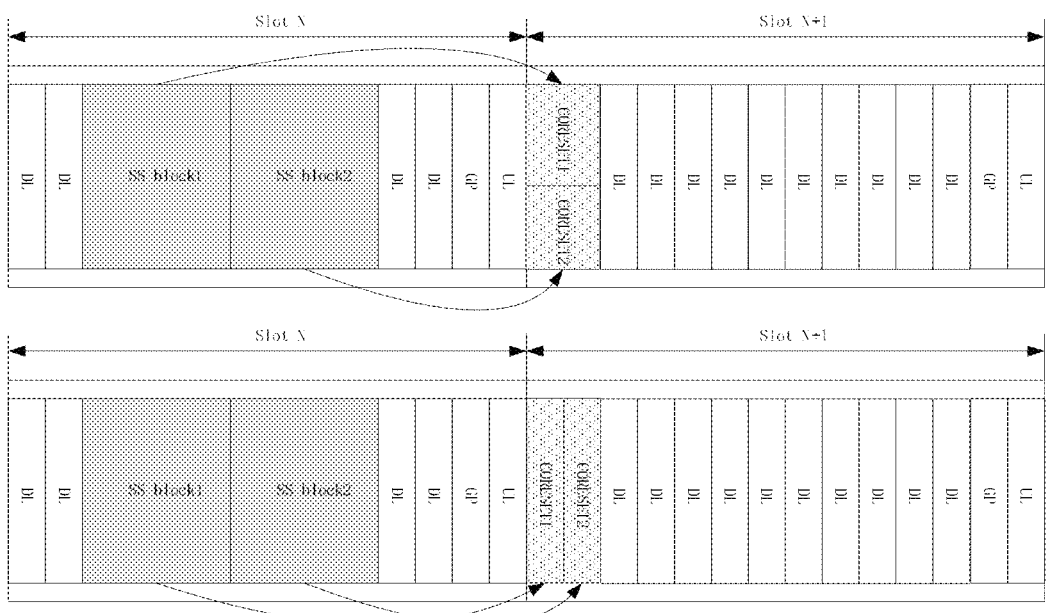
FIG. 7 is still yet another schematic view showing the transmission of the common downlink control channel according to one embodiment of the present disclosure.

In addition, the CORESET for transmitting the common downlink control channel may be located within one or more slots other than a slot within which the SS block is transmitted, and at least one CORESET for transmitting the common downlink control channel may be configured through the MIB in one SS block. As shown in FIG. 7, different CORESETs may be used in a TDM or an FDM manner. A beam direction for each CORESET may be the same as, different from, that for the corresponding SS block. Of course, one SS block may corresponding to a plurality of CORESETs for transmitting the downlink control channel, and the CORESETs for transmitting the common downlink control channel may correspond to a same beam direction or different beam directions.

In a possible embodiment of the present disclosure, the bandwidth occupied by CORESET configured by MIB may be within, the same as, or other than the transmission bandwidth of SS block, which is not limited herein.

In a possible embodiment of the present disclosure, partial or all the contents in the configuration information of the resource set may be indicated through the MIB in the synchronization signal block in the form of table indicates, and the table indicates may be indices in configuration information table predefined in a protocol; or partial the contents in the configuration information may be notified through the MIB in the synchronization signal block, and the remaining contents in the configuration information may be predefined in a protocol.

During the implementation, the configuration information may be indicated through the table indices, so as to reduce the signaling overhead. In addition, partial the contents in the configuration information may be notified through the MIB, and the remaining contents in the configuration information may be predefined in a protocol, so as to reduce the overhead for the MIB. The partial the contents in the configuration information notified through the MIB may be information in the configuration information associated with the SS block, e.g., relevant information about the frequency-domain position and the time-domain position. The other contents, e.g., the relevant information about the mapping relationship between CCEs and REGs, the mapping relationship between PDCCHs and CCEs, a detection periodicity and a beam direction, may be predefined in a protocol.

In a possible embodiment of the present disclosure, the table indices may be used to index combinations of partial or all contents in the configuration information, or partial or all contents in the configuration information.

When the table indices are used to index combinations of partial or all contents in the configuration information, it means joint indication, i.e., a plurality of contents in the configuration information may be indicated through one index, so as to reduce a length of a bit field in the MIB as possible.

When indexing the partial or all contents in the configuration information, each content may be configured with an index, e.g., a CORESET size, a CORESET position, the mapping relationship between the CCEs and the REGs, the mapping relationship between the PDCCHs and the CCEs, a transmission periodicity of a common PDCCH, and QCL information relative to the SS block may each be indicated through an individual index.

In a possible embodiment of the present disclosure, the CORESET size may be a subset predefined in a protocol (e.g., a CORESET in configuration #1 may occupy N1 Physical Resource Blocks (PRBs) and M1 OFDM symbols, and a CORESET in configuration #2 may occupy N2 PRBs and M2 OFDM symbols). A position of each CORESET may be a position relative to the corresponding SS block (e.g., the CORESET may be spaced apart from the SS block by P OFDM symbols in a time domain and by Q PRBs in a frequency domain, and each CORESET may be located at one of a plurality of candidate positions relative to the SS block).

Alternatively, there may exist A CORESET size sets, and each CORESET may be located at one of B candidate positions relative to the SS block. A CCE-to-REG mapping rule may include a localized rule and a distributed rule, and a PDCCH-to-CCE mapping rule may include a localized rule and a distributed rule. There may exist C transmission periodicities for the common PDCCH, and there may exist D QCL parameters of the SS block. For example, when A=2, B=2, C=4 and D=4, there may totally exist 2*2*2*4*4=256 combinations for the parameters of the common downlink control channel, so totally 8-bit information needs to be transmitted in the MIB. Of course, it is merely necessary to indicate a subset of the combinations as predefined in a protocol.

Of course, the parameters to be indicated jointly may not be limited to the above-mentioned six parameters, and any other parameters to be notified may also be indicated jointly, or merely partial the parameters may be indicated jointly (the other parameters not to be indicated may be predefined in a protocol), which will not be particularly defined herein.

For example, based on the above example where the resource set (CORESET) for transmitting the common downlink control channel and the relevant parameters are indicated through the MIB, bit information for indicating the common downlink control channel in the MIB shall be as less as possible. In one implementation mode, a plurality of pieces of configuration information may be indicated jointly, i.e., a combination of partial or all contents may be indicated. For example, the parameters related to the common downlink control channel may include resource configuration information about the CORESET for transmitting the common downlink control channel, the CCE-to-REG mapping rule, the PDCCH-to-CCE mapping rule, a periodicity of the common downlink control channel (i.e., a monitoring periodicity), and the QCL parameters of the common downlink control channel or the DRMS for the CORESET for transmitting the common downlink control channel relative to the corresponding SS block. A joint indication table may be introduced into a protocol, and parameter configuration information about the common downlink control channel may be indicated through indicating an index in the table. To be specific, when the resource positions of the CORESET for transmitting the common downlink control channel include two candidate positions, the CORESETs have two different sizes, the CCE-to-REG mapping rule includes a localized rule and a distributed rule, the PDCCH-to-CCE mapping rule includes a localized rule and a distributed rule, there are four periodicities of the common downlink control channel (common PDCCH occasion periodicity, e.g., {each slot, every two slots, every four slots, and every eight slots}, and there are two common downlink control channels or two QCL parameters of the DMRS for the CORESET for transmitting the common downlink control channel relative to the corresponding SS block, there may totally exist 2*2*2*4*2=64 combinations that need to be indicated through 6-bit information. In a possible embodiment of the present disclosure, when it is merely necessary to indicate partial the parameters, e.g., when the CCE-to-REG mapping rule and the PDCCH-to-CCE mapping rule are predefined in a protocol, 16 combinations need to be indicated merely through 4-bit information, as shown in Table 1.

For example, when the parameter configuration indication information about the common downlink control channel in the MIB is 0000, it means that the CORESET for transmitting the common downlink control channel is located at a candidate position 1, the occasion periodicity is P1, and the QCL parameter relative to the SS block is Q1. Upon the receipt of the configuration parameters, the UE may detect and receive the common downlink control channel at the candidate position 1 in accordance with P1 and Q1.

Figure 8:
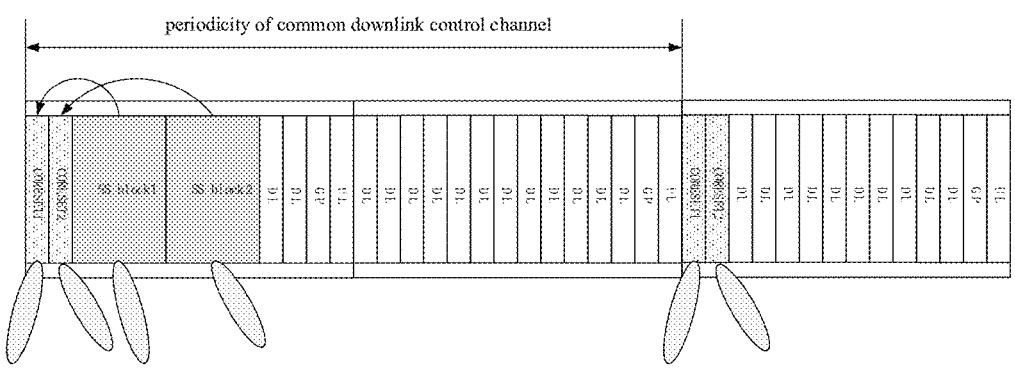
FIG. 8 is still yet another schematic view showing the transmission of the common downlink control channel according to one embodiment of the present disclosure.

As a special example, when the resource position of the CORESET is the candidate position 1, a detection periodicity is P1=2 slots, and the QCL parameter is Q1 as determined in accordance with a joint indication information field in the MIB, the transmission of the common downlink control channel may be shown in FIG. 8.

In a possible embodiment of the present disclosure, the parameter joint indication table may consist of partial the combinations as predefined in a protocol. In the above-mentioned case, when there are totally 64 combinations and merely partial the combinations need to be indicated as predefined in a protocol (e.g., merely 15 of the 64 combinations need to be indicated), merely 4-bit indication information may be carried in the MIB for the indication.

TABLE 1

| Indication information field in MIB | Parameter configuration of common downlink control channel | | |
|---|---|---|---|
| | CORESET resource configuration | Detection Periodicity | QCL parameter |
| 0000 | Candidate position 1 | P1 | Q1 |
| 0001 | Candidate position 1 | P1 | Q2 |
| 0010 | Candidate position 1 | P2 | Q1 |
| 0011 | Candidate position 1 | P2 | Q2 |

TABLE 1-continued

| | Parameter configuration of common downlink control channel | | |
|---|---|---|---|
| Indication information field in MIB | CORESET resource configuration | Detection Periodicity | QCL parameter |
| 0100 | Candidate position 1 | P3 | Q1 |
| 0101 | Candidate position 1 | P3 | Q2 |
| 0110 | Candidate position 1 | P4 | Q1 |
| 0111 | Candidate position 1 | P4 | Q2 |
| 1000 | Candidate position 2 | P1 | Q1 |
| 1001 | Candidate position 2 | P1 | Q2 |
| 1010 | Candidate position 2 | P2 | Q1 |
| 1011 | Candidate position 2 | P2 | Q2 |
| 1100 | Candidate position 2 | P3 | Q1 |
| 1101 | Candidate position 2 | P3 | Q2 |
| 1110 | Candidate position 2 | P4 | Q1 |
| 1111 | Candidate position 2 | P4 | Q2 |

The quantity of the parameters of the common downlink control channel to be indicated jointly may be determined in a protocol, and the quantity of the parameters and the quantity of the parameters to be indicated will not be particularly defined herein.

In a possible embodiment of the present disclosure, merely partial the parameters may be indicated jointly in the form of a table, and the other parameters may be predefined in a protocol or indicated through any other information field.

It should be appreciated that, the configuration information about a plurality of CORESETs may be carried in the MIB, i.e., the plurality of CORESETs may be configured for the transmission of the common downlink control channel.

In a possible embodiment of the present disclosure, the target signal may be used to configure partial or all contents in the configuration information of the resource set.

During the implementation, the resource set may directly be configured through the target signal, so as to improve the transmission flexibility of the common downlink control channel. The description about the configuration information may refer to that mentioned hereinabove, and thus will not be particularly defined herein. In addition, after determining the configuration information in accordance with the target signal, the UE may detect and receive the common downlink control channel in the resource set. Further, the UE may determine the resource set in accordance with the configuration information, and detect and receive the common downlink control channel in the resource set.

In a possible embodiment of the present disclosure, the target signal may include RMSI, a message 2 in a random access process, or a message 4 in the random access process.

During the implementation, the resource set may be configured through the RMSI, the message 2 in the random access process or the message 4 in the random access process without any additional signaling, so it is able to save the transmission resources.

In a possible embodiment of the present disclosure, relevant parameters of the beam for transmitting the common downlink control channel on the resource set may be determined in accordance with a QCL parameter of the synchronization signal block corresponding to the resource set.

During the implementation, the UE may determine the relevant parameters of the beam for transmitting the common downlink control channel in accordance with the QCL parameter of the SS block, e.g., a beam direction or a beam serial number. In addition, the UE may detect and receive the common downlink control channel using a same beam as, or a beam different from, the corresponding SS block, so as to improve the transmission flexibility of the common downlink control channel.

It should be appreciated that, the various implementation modes may be implement in a combination manner or in a separate manner. For example, the implementation mode where the target signal is used to configure partial or all contents in the configuration information of the resource set may be combined with the implementation mode where the target signal is the SS block. The following description will be given when the resource set in the implementation mode where the target signal is the SS block is a first common CORESET and the resource set in the implementation mode where the target signal is used to configure partial or all contents in the configuration information of the resource set is a second common CORESET. A network side device may configure the additional second common CORESET on the basis of the first common CORESET configured for the SS block, so as to transmit the common downlink control channel or a UE-specific downlink control channel. For example, the UE may acquire the configuration information about the second common CORESET in accordance with relevant information carried in the RMSI. The RMSI may be scheduled through the common downlink control channel for the transmission of the first CORESET. A beam used for transmitting the second common CORESET for the RMSI may be determined in accordance with a beam direction parameter carried in the RMSI, e.g., an SS parameter of the SS block received by the UE. The network side device may configure one or more second common CORESETs through the RMSI. The plurality of second common CORESETs may be used in a TDM or FDM manner, and they may be transmitted using a same beam or different beams. The description about the configuration information may refer to that mentioned hereinabove, and thus will not be particularly defined herein. Of course, the description is merely given herein by taking the RMSI as an example. The configuration information about the second common CORESET may also be acquired in accordance with relevant information carried in the Msg2 or Msg4 in the random access process. An acquisition process thereof may refer to that of the RMSI, and thus will not be particularly defined herein.

According to the embodiments of the present disclosure, the UE may receive the target signal from the network side device, and the resource set for transmitting the common downlink control channel may be associated with the target signal. Then, the UE may determine the resource set in accordance with the target signal, and receive the common downlink control channel from the network side device through the resource set. Because the resource set for transmitting the common downlink control channel is associated with the target signal, it is able to flexibly adjust the resource set, thereby to improve the transmission flexibility of the common downlink control channel.

Figure 9:
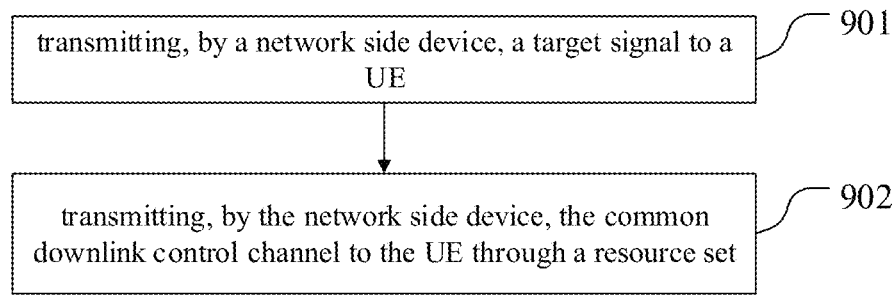
FIG. 9 is a flow chart of a common downlink control channel transmission method according to one embodiment of the present disclosure.

The present disclosure further provides in some embodiments a common downlink control channel transmission method which, as shown in FIG. 9, includes: Step 901 of transmitting, by a network side device, a target signal to a UE, a resource set for transmitting a common downlink control channel being associated with the target signal; and Step 902 of transmitting, by the network side device, the common downlink control channel to the UE through the resource set.

In a possible embodiment of the present disclosure, the target signal may include a synchronization signal block.

In a possible embodiment of the present disclosure, an OFDM symbol occupied by the resource set may be the same as an OFDM symbol occupied by the synchronization signal block, and a transmission periodicity of the common downlink control channel may be the same as a transmission periodicity of the synchronization signal block.

In a possible embodiment of the present disclosure, a time-frequency-domain resource occupied by the resource set and a time-frequency-domain resource occupied by the synchronization signal block may be used in an FDM manner.

In a possible embodiment of the present disclosure, the common downlink control channel and the synchronization signal block may be transmitted on a same OFDM symbol using a same beam.

In a possible embodiment of the present disclosure, all contents of configuration information of the resource set may be predefined in a protocol, or partial or all contents of the configuration information of the resource set may be configured through an MIB in the synchronization signal block.

In a possible embodiment of the present disclosure, the configuration information of the resource set may include one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set may be determined through the synchronization signal block and/or predefined in a protocol.

In a possible embodiment of the present disclosure, one synchronization signal block may correspond to at least one resource set for transmitting the common downlink control channel. The configuration information may be indicated explicitly and/or implicitly indicated through the MIB in the synchronization signal block, or there may exist a relationship predefined in a protocol between the configuration information and the synchronization signal block.

In a possible embodiment of the present disclosure, a time-frequency-domain position of the at least one resource set for transmitting the common downlink control channel corresponding to the synchronization signal block may be notified through the MIB in one synchronization signal block.

In a possible embodiment of the present disclosure, one synchronization signal block may correspond to at least one time-frequency-domain position of the at least one resource set for transmitting the common downlink control channel. One synchronization signal block may be located within a same slot as the at least one resource set for transmitting the common downlink control channel corresponding to the synchronization signal block, and the at least one resource set for transmitting the common downlink control channel may be located before the synchronization signal block; or one synchronization signal block may be located within a same slot as the at least one resource set for transmitting the common downlink control channel corresponding to the synchronization signal block, and the at least one resource set for transmitting the common downlink control channel may be located after the synchronization signal block; or one synchronization signal block may be located within on a same OFDM symbol within a same slot as the at least one resource set for transmitting the common downlink control channel corresponding to the synchronization signal block; or the at least one resource set for transmitting the common downlink control channel corresponding to one synchronization signal block may be located within one or more slots other than a slot within which the synchronization signal block is transmitted; or one synchronization signal block may occupy a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block may be notified through the MIB in the synchronization signal block or predefined in a protocol.

In a possible embodiment of the present disclosure, a beam for the transmission of the common downlink control channel may be the same as a beam for the transmission of the corresponding synchronization signal block, or the beam for the transmission of the common downlink control channel may be indicated through the MIB in the corresponding synchronization signal block.

In a possible embodiment of the present disclosure, partial or all the contents in the configuration information of the resource set may be indicated through the MIB in the synchronization signal block in the form of table indicates, and the table indices may be indices in configuration information table predefined in a protocol; or partial the contents in the configuration information may be notified through the MIB in the synchronization signal block, and the remaining contents in the configuration information may be predefined in a protocol.

In a possible embodiment of the present disclosure, the table indices may be used to index combinations of partial or all contents in the configuration information, or partial or all contents in the configuration information.

In a possible embodiment of the present disclosure, the target signal may be used to configure partial or all contents in the configuration information of the resource set.

In a possible embodiment of the present disclosure, the target signal may include RMSI, a message 2 in a random access process, or a message 4 in the random access process.

In a possible embodiment of the present disclosure, relevant parameters of the beam for transmitting the common downlink control channel on the resource set may be determined in accordance with a QCL parameter of the synchronization signal block corresponding to the resource set.

It should be appreciated that, the implementation of the common downlink control channel transmission method in the embodiments of the present may refer to that of the network side device in FIG. 2 with a same beneficial effect, and thus will not be particularly defined herein.

Figure 10:
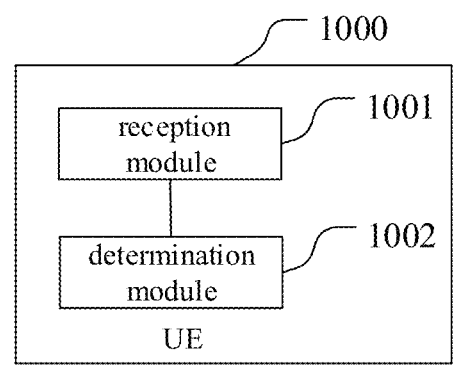
FIG. 10 is a schematic view showing a UE according to one embodiment of the present disclosure.

The present disclosure further provides in some embodiments a UE 1000 which, as shown in FIG. 10, includes: a reception module 1001 configured to receive a target signal from a network side device, a resource set for transmitting a common downlink control channel being associated with the target signal; and a determination module 1002 configured to determine the resource set in accordance with the target signal, and receive the common downlink control channel from the network side device through the resource set.

In a possible embodiment of the present disclosure, the target signal may include a synchronization signal block.

In a possible embodiment of the present disclosure, an OFDM symbol occupied by the resource set may be the same as an OFDM symbol occupied by the synchronization signal block, and a transmission periodicity of the common downlink control channel may be the same as a transmission periodicity of the synchronization signal block.

In a possible embodiment of the present disclosure, a time-frequency-domain resource occupied by the resource set and a time-frequency-domain resource occupied by the synchronization signal block may be used in an FDM manner.

In a possible embodiment of the present disclosure, the common downlink control channel and the synchronization signal block may be transmitted on a same OFDM symbol using a same beam.

In a possible embodiment of the present disclosure, all contents of configuration information of the resource set may be predefined in a protocol, or partial or all contents of the configuration information of the resource set may be configured through an MIB in the synchronization signal block.

In a possible embodiment of the present disclosure, the configuration information of the resource set may include one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set may be determined through the synchronization signal block and/or predefined in a protocol.

In a possible embodiment of the present disclosure, one synchronization signal block may correspond to at least one resource set for transmitting the common downlink control channel. The configuration information may be indicated explicitly and/or implicitly indicated through the MIB in the synchronization signal block, or there may exist a relationship predefined in a protocol between the configuration information and the synchronization signal block.

In a possible embodiment of the present disclosure, a time-frequency-domain position of the at least one resource set for transmitting the common downlink control channel corresponding to the synchronization signal block may be notified through the MIB in one synchronization signal block.

In a possible embodiment of the present disclosure, one synchronization signal block may correspond to at least one time-frequency-domain position of the at least one resource set for transmitting the common downlink control channel. One synchronization signal block may be located within a same slot as the at least one resource set for transmitting the common downlink control channel corresponding to the synchronization signal block, and the at least one resource set for transmitting the common downlink control channel may be located before the synchronization signal block; or one synchronization signal block may be located within a same slot as the at least one resource set for transmitting the common downlink control channel corresponding to the synchronization signal block, and the at least one resource set for transmitting the common downlink control channel may be located after the synchronization signal block; or one synchronization signal block may be located within on a same OFDM symbol within a same slot as the at least one resource set for transmitting the common downlink control channel corresponding to the synchronization signal block; or the at least one resource set for transmitting the common downlink control channel corresponding to one synchronization signal block may be located within one or more slots other than a slot within which the synchronization signal block is transmitted; or one synchronization signal block may occupy a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block may be notified through the MIB in the synchronization signal block or predefined in a protocol.

In a possible embodiment of the present disclosure, a beam for the transmission of the common downlink control channel may be the same as a beam for the transmission of the corresponding synchronization signal block, or the beam for the transmission of the common downlink control channel may be indicated through the MIB in the corresponding synchronization signal block.

In a possible embodiment of the present disclosure, partial or all the contents in the configuration information of the resource set may be indicated through the MIB in the synchronization signal block in the form of table indicates, and the table indices may be indices in configuration information table predefined in a protocol; or partial the contents in the configuration information may be notified through the MIB in the synchronization signal block, and the remaining contents in the configuration information may be predefined in a protocol.

In a possible embodiment of the present disclosure, the table indices may be used to index combinations of partial or all contents in the configuration information, or partial or all contents in the configuration information.

In a possible embodiment of the present disclosure, the target signal may be used to configure partial or all contents in the configuration information of the resource set.

In a possible embodiment of the present disclosure, the target signal may include RMSI, a message 2 in a random access process, or a message 4 in the random access process.

In a possible embodiment of the present disclosure, relevant parameters of the beam for transmitting the common downlink control channel on the resource set may be determined in accordance with a QCL parameter of the synchronization signal block corresponding to the resource set.

It should be appreciated that, the implementation of the UE 1000 in the embodiments of the present may refer to that of the UE mentioned hereinabove in the method embodiments with a same beneficial effect, and thus will not be particularly defined herein.

Figure 11:
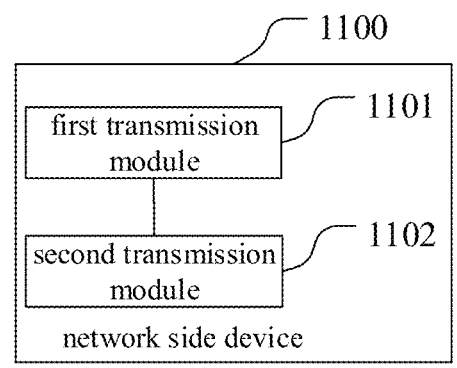
FIG. 11 is a schematic view showing a network side device according to one embodiment of the present disclosure.

The present disclosure further provides in some embodiments a network side device 1100 which, as shown in FIG. 11, includes: a first transmission module 1101 configured to transmit a target signal to a UE, a resource set for transmitting a common downlink control channel being associated with the target signal; and a second transmission module 1102 configured to transmit the common downlink control channel to the UE through the resource set.

In a possible embodiment of the present disclosure, the target signal may include a synchronization signal block.

In a possible embodiment of the present disclosure, an OFDM symbol occupied by the resource set may be the same as an OFDM symbol occupied by the synchronization signal block, and a transmission periodicity of the common downlink control channel may be the same as a transmission periodicity of the synchronization signal block.

In a possible embodiment of the present disclosure, a time-frequency-domain resource occupied by the resource set and a time-frequency-domain resource occupied by the synchronization signal block may be used in an FDM manner.

In a possible embodiment of the present disclosure, the common downlink control channel and the synchronization signal block may be transmitted on a same OFDM symbol using a same beam.

In a possible embodiment of the present disclosure, all contents of configuration information of the resource set may be predefined in a protocol, or partial or all contents of the configuration information of the resource set may be configured through an MIB in the synchronization signal block.

In a possible embodiment of the present disclosure, the configuration information may include one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set may be determined through the synchronization signal block and/or predefined in a protocol.

In a possible embodiment of the present disclosure, one synchronization signal block may correspond to at least one resource set for transmitting the common downlink control channel. The configuration information may be indicated explicitly and/or implicitly indicated through the MIB in the synchronization signal block, or there may exist a relationship predefined in a protocol between the configuration information and the synchronization signal block.

In a possible embodiment of the present disclosure, a time-frequency-domain position of the at least one resource set for transmitting the common downlink control channel corresponding to the synchronization signal block may be notified through the MIB in one synchronization signal block.

In a possible embodiment of the present disclosure, one synchronization signal block may correspond to at least one time-frequency-domain position of the at least one resource set for transmitting the common downlink control channel. One synchronization signal block may be located within a same slot as the at least one resource set for transmitting the common downlink control channel corresponding to the synchronization signal block, and the at least one resource set for transmitting the common downlink control channel may be located before the synchronization signal block; or one synchronization signal block may be located within a same slot as the at least one resource set for transmitting the common downlink control channel corresponding to the synchronization signal block, and the at least one resource set for transmitting the common downlink control channel may be located after the synchronization signal block; one synchronization signal block may be located within on a same OFDM symbol within a same slot as the at least one resource set for transmitting the common downlink control channel corresponding to the synchronization signal block; or the at least one resource set for transmitting the common downlink control channel corresponding to one synchronization signal block may be located within one or more slots other than a slot within which the synchronization signal block is transmitted; or one synchronization signal block may occupy a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block may be notified through the MIB in the synchronization signal block or predefined in a protocol.

In a possible embodiment of the present disclosure, a beam for the transmission of the common downlink control channel may be the same as a beam for the transmission of the corresponding synchronization signal block, or the beam for the transmission of the common downlink control channel may be indicated through the MIB in the corresponding synchronization signal block.

In a possible embodiment of the present disclosure, partial or all the contents in the configuration information of the resource set may be indicated through the MIB in the synchronization signal block in the form of table indicates, and the table indices may be indices in configuration information table predefined in a protocol; or partial the contents in the configuration information may be notified through the MIB in the synchronization signal block, and the remaining contents in the configuration information may be predefined in a protocol.

In a possible embodiment of the present disclosure, the table indices may be used to index combinations of partial or all contents in the configuration information, or partial or all contents in the configuration information.

In a possible embodiment of the present disclosure, the target signal may be used to configure partial or all contents in the configuration information of the resource set.

In a possible embodiment of the present disclosure, the target signal may include RMSI, a message 2 in a random access process, or a message 4 in the random access process.

In a possible embodiment of the present disclosure, relevant parameters of the beam for transmitting the common downlink control channel on the resource set may be determined in accordance with a QCL parameter of the synchronization signal block corresponding to the resource set.

It should be appreciated that, the implementation of the network side device 1100 in the embodiments of the present may refer to the network side device mentioned in the above method embodiments with a same beneficial effect, and thus will not be particularly defined herein.

Figure 12:
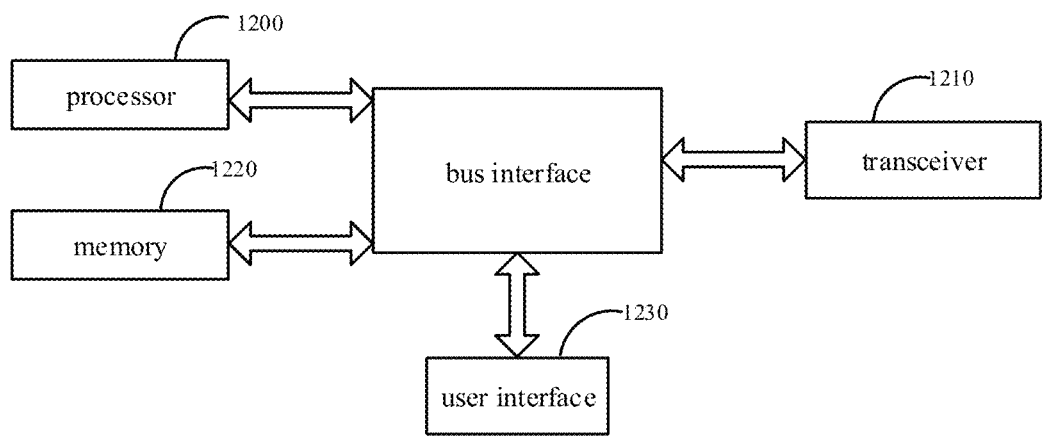
FIG. 12 is another schematic view showing the UE according to one embodiment of the present disclosure.

The present disclosure further provides in some embodiments a UE which, as shown in FIG. 12, includes a processor 1200, a transceiver 1210, a memory 1220, a user interface 1230 and a bus interface. The processor 1200 is configured to read a program stored in the memory 1220, so as to: receive through the transceiver 1210 a target signal from a network side device, a resource set for transmitting a common downlink control channel being associated with the target signal; and determine the resource set in accordance with the target signal, and receive through the transceiver 1210 the common downlink control channel from the network side device through the resource set. The transceiver 1210 is configured to receive and transmit data under the control of the processor 1200.

In FIG. 12, bus architecture may include a number of buses and bridges connected to each other, so as to connect various circuits for one or more processors 1200 and one or more memories 1220. In addition, as is known in the art, the bus architecture may be used to connect any other circuits, such as a circuit for a peripheral device, a circuit for a voltage stabilizer and a power management circuit. The bus interface may be provided, and the transceiver 1210 may consist of a plurality of elements, i.e., a transmitter and a receiver for communication with any other devices over a transmission medium. With respect to different UEs, the user interface 1230 may also be provided for devices which are to be arranged inside or outside the UE, and these devices may include but not limited to a keypad, a display, a speaker, a microphone and a joystick. The processor 1200 may take charge of managing the bus architecture as well as general processings. The memory 1220 may store therein data for the operation of the processor 1200.

In a possible embodiment of the present disclosure, the target signal may include a synchronization signal block.

In a possible embodiment of the present disclosure, an OFDM symbol occupied by the resource set may be the same as an OFDM symbol occupied by the synchronization signal block, and a transmission periodicity of the common downlink control channel may be the same as a transmission periodicity of the synchronization signal block.

In a possible embodiment of the present disclosure, a time-frequency-domain resource occupied by the resource set and a time-frequency-domain resource occupied by the synchronization signal block may be used in an FDM manner.

In a possible embodiment of the present disclosure, the common downlink control channel and the synchronization signal block may be transmitted on a same OFDM symbol using a same beam.

In a possible embodiment of the present disclosure, all contents of configuration information of the resource set may be predefined in a protocol, or partial or all contents of the configuration information of the resource set may be configured through an MIB in the synchronization signal block.

In a possible embodiment of the present disclosure, the configuration information of the resource set may include one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set may be determined through the synchronization signal block and/or predefined in a protocol.

In a possible embodiment of the present disclosure, one synchronization signal block may correspond to at least one resource set for transmitting the common downlink control channel. The configuration information may be indicated explicitly and/or implicitly indicated through the MIB in the synchronization signal block, or there may exist a relationship between the configuration information and the synchronization signal block predefined in a protocol.

In a possible embodiment of the present disclosure, a time-frequency-domain position of the at least one resource set for transmitting the common downlink control channel corresponding to the synchronization signal block may be notified through the MIB in one synchronization signal block.

In a possible embodiment of the present disclosure, one synchronization signal block may correspond to at least one time-frequency-domain position of the at least one resource set for transmitting the common downlink control channel. One synchronization signal block may be located within a same slot as the at least one resource set for transmitting the common downlink control channel corresponding to the synchronization signal block, and the at least one resource set for transmitting the common downlink control channel may be located before the synchronization signal block; or one synchronization signal block may be located within a same slot as the at least one resource set for transmitting the common downlink control channel corresponding to the synchronization signal block, and the at least one resource set for transmitting the common downlink control channel may be located after the synchronization signal block; one synchronization signal block may be located within on a same OFDM symbol within a same slot as the at least one resource set for transmitting the common downlink control channel corresponding to the synchronization signal block; or the at least one resource set for transmitting the common downlink control channel corresponding to one synchronization signal block may be located within one or more slots other than a slot within which the synchronization signal block is transmitted; or one synchronization signal block may occupy a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block may be notified through the MIB in the synchronization signal block or predefined in a protocol.

In a possible embodiment of the present disclosure, a beam for the transmission of the common downlink control channel may be the same as a beam for the transmission of the corresponding synchronization signal block, or the beam for the transmission of the common downlink control channel may be indicated through the MIB in the corresponding synchronization signal block.

In a possible embodiment of the present disclosure, partial or all the contents in the configuration information of the resource set may be indicated through the MIB in the synchronization signal block in the form of table indicates, and the table indices may be indices in configuration information table predefined in a protocol; or partial the contents in the configuration information may be notified through the MIB in the synchronization signal block, and the remaining contents in the configuration information may be predefined in a protocol.

In a possible embodiment of the present disclosure, the table indices may be used to index combinations of partial or all contents in the configuration information, or partial or all contents in the configuration information.

In a possible embodiment of the present disclosure, the target signal may be used to configure partial or all contents in the configuration information of the resource set.

In a possible embodiment of the present disclosure, the target signal may include RMSI, a message 2 in a random access process, or a message 4 in the random access process.

In a possible embodiment of the present disclosure, relevant parameters of the beam for transmitting the common downlink control channel on the resource set may be determined in accordance with a QCL parameter of the synchronization signal block corresponding to the resource set.

It should be appreciated that, the implementation of the UE in the embodiments of the present may refer to that of the UE mentioned hereinabove in the method embodiments with a same beneficial effect, and thus will not be particularly defined herein.

Figure 13:
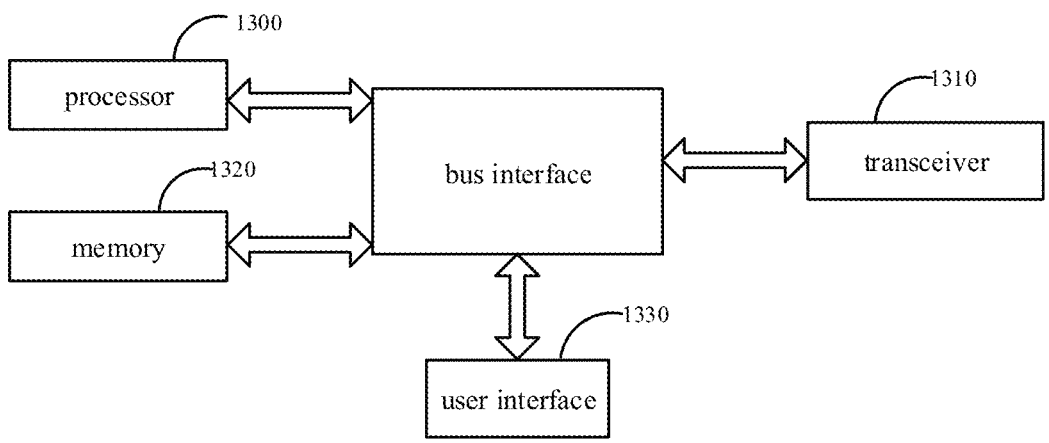
FIG. 13 is another schematic view showing the network side device according to one embodiment of the present disclosure.

The present disclosure further provides in some embodiments a network side device which, as shown in FIG. 13, includes a processor 1300, a transceiver 1310, a memory 1320, a user interface 1330 and a bus interface. The processor 1300 is configured to read a program stored in the memory 1320, so as to: transmit through the transceiver 1310 a target signal to a UE, a resource set for transmitting a common downlink control channel being associated with the target signal; and transmit through the transceiver 1310 the common downlink control channel to the UE through the resource set. The transceiver 1310 is configured to receive and transmit data under the control of the processor 1300.

In FIG. 13, bus architecture may include a number of buses and bridges connected to each other, so as to connect various circuits for one or more processors 1300 and one or more memories 1320. In addition, as is known in the art, the bus architecture may be used to connect any other circuits, such as a circuit for a peripheral device, a circuit for a voltage stabilizer and a power management circuit. The bus interface may be provided, and the transceiver 1310 may consist of a plurality of elements, i.e., a transmitter and a receiver for communication with any other devices over a transmission medium. With respect to different UEs, the user interface 1330 may also be provided for devices which are to be arranged inside or outside the UE, and these devices may include but not limited to a keypad, a display, a speaker, a microphone and a joystick. The processor 1300 may take charge of managing the bus architecture as well as general processings. The memory 1320 may store therein data for the operation of the processor 1300.

In a possible embodiment of the present disclosure, the target signal may include a synchronization signal block.

In a possible embodiment of the present disclosure, an OFDM symbol occupied by the resource set may be the same as an OFDM symbol occupied by the synchronization signal block, and a transmission periodicity of the common downlink control channel may be the same as a transmission periodicity of the synchronization signal block.

In a possible embodiment of the present disclosure, a time-frequency-domain resource occupied by the resource set and a time-frequency-domain resource occupied by the synchronization signal block may be used in an FDM manner.

In a possible embodiment of the present disclosure, the common downlink control channel and the synchronization signal block may be transmitted on a same OFDM symbol using a same beam.

In a possible embodiment of the present disclosure, all contents of configuration information of the resource set may be predefined in a protocol, or partial or all contents of the configuration information of the resource set may be configured through an MIB in the synchronization signal block.

In a possible embodiment of the present disclosure, the configuration information of the resource set may include one or more of a mapping relationship between CCEs and REGs, a mapping relationship between PDCCH candidate resources and the CCEs, information about a DMRS port mode, information about a resource size, and a resource position relative to the synchronization signal block.

In a possible embodiment of the present disclosure, the configuration information of the resource set may be determined through the synchronization signal block and/or predefined in a protocol.

In a possible embodiment of the present disclosure, one synchronization signal block may correspond to at least one resource set for transmitting the common downlink control channel. The configuration information may be indicated explicitly and/or implicitly indicated through the MIB in the synchronization signal block, or there may exist a relationship between the configuration information and the synchronization signal block predefined in a protocol.

In a possible embodiment of the present disclosure, a time-frequency-domain position of the at least one resource set for transmitting the common downlink control channel corresponding to the synchronization signal block may be notified through the MIB in one synchronization signal block.

In a possible embodiment of the present disclosure, one synchronization signal block may correspond to at least one time-frequency-domain position of the at least one resource set for transmitting the common downlink control channel. One synchronization signal block may be located within a same slot as the at least one resource set for transmitting the common downlink control channel corresponding to the synchronization signal block, and the at least one resource set for transmitting the common downlink control channel may be located before the synchronization signal block; or one synchronization signal block may be located within a same slot as the at least one resource set for transmitting the common downlink control channel corresponding to the synchronization signal block, and the at least one resource set for transmitting the common downlink control channel may be located after the synchronization signal block; one synchronization signal block may be located within on a same OFDM symbol within a same slot as the at least one resource set for transmitting the common downlink control channel corresponding to the synchronization signal block; or the at least one resource set for transmitting the common downlink control channel corresponding to one synchronization signal block may be located within one or more slots other than a slot within which the synchronization signal block is transmitted; or one synchronization signal block may occupy a same frequency-domain resource as the at least one resource set for transmitting the common downlink control channel corresponding to the synchronization signal block.

In a possible embodiment of the present disclosure, a periodicity of the at least one resource set for transmitting the common downlink control channel corresponding to one synchronization signal block may be notified through the MIB in the synchronization signal block or predefined in a protocol.

In a possible embodiment of the present disclosure, a beam for the transmission of the common downlink control channel may be the same as a beam for the transmission of the corresponding synchronization signal block, or the beam for the transmission of the common downlink control channel may be indicated through the MIB in the corresponding synchronization signal block.

In a possible embodiment of the present disclosure, partial or all the contents in the configuration information of the resource set may be indicated through the MIB in the synchronization signal block in the form of table indicates, and the table indices may be indices in configuration information table predefined in a protocol; or partial the contents in the configuration information may be notified through the MIB in the synchronization signal block, and the remaining contents in the configuration information may be predefined in a protocol.

In a possible embodiment of the present disclosure, the table indices may be used to index combinations of partial or all contents in the configuration information, or index partial or all contents in the configuration information.

In a possible embodiment of the present disclosure, the target signal may be used to configure partial or all contents in the configuration information of the resource set.

In a possible embodiment of the present disclosure, the target signal may include RMSI, a message 2 in a random access process, or a message 4 in the random access process.

In a possible embodiment of the present disclosure, relevant parameters of the beam for transmitting the common downlink control channel on the resource set may be determined in accordance with a QCL parameter of the synchronization signal block corresponding to the resource set.

It should be appreciated that, the implementation of the network side device in the embodiments of the present may refer to the network side device mentioned in the above method embodiments with a same beneficial effect, and thus will not be particularly defined herein.

The present disclosure further provides in some embodiments a computer-readable storage medium storing therein a computer program. The computer program is executed by a processor, so as to: receive a target signal from a network side device, a resource set for transmitting a common downlink control channel being associated with the target signal; and determine the resource set in accordance with the target signal, and receive the common downlink control channel from the network side device through the resource set.

In a possible embodiment of the present disclosure, the computer program may be executed by the processor so as to implement the common downlink control channel transmission method for the UE mentioned hereinabove.

The present disclosure further provides in some embodiments a computer-readable storage medium storing therein a computer program. The computer program is executed by a processor so as to: transmit a target signal to a UE, a resource set for transmitting a common downlink control channel being associated with the target signal; and transmit the common downlink control channel to the UE through the resource set.

In a possible embodiment of the present disclosure, the computer program may be executed by the processor so as to implement the common downlink control channel transmission method for the network side device mentioned hereinabove.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or partial the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A common downlink control channel transmission method, comprising:
   receiving, by a User Equipment (UE), a target signal from a network side device, which a resource set for transmitting a common downlink control channel is associated with the target signal; and
   determining, by the UE, the resource set in accordance with the target signal, and receiving the common downlink control channel from the network side device through the resource set,
   wherein the target signal includes a synchronization signal block,
   wherein an Orthogonal Frequency Division Multiplexing (OFDM) symbol occupied by the resource set is the same as an OFDM symbol occupied by the synchronization signal block, and a transmission periodicity of the common downlink control channel is the same as a transmission periodicity of the synchronization signal block.

2. The common downlink control channel transmission method according to claim 1, wherein a time-frequency-domain resource occupied by the resource set and a time-frequency-domain resource occupied by the synchronization signal block are used in a Frequency Division Multiplexing (FDM) manner.

3. The common downlink control channel transmission method according to claim 1, wherein the common downlink control channel and the synchronization signal block are transmitted on a same OFDM symbol using a same beam.

4. The common downlink control channel transmission method according to claim 1, wherein all contents of configuration information of the resource set are predefined in a protocol, or partial or all contents of the configuration information of the resource set are configured through a Master Information Block (MIB) in the synchronization signal block.

5. The common downlink control channel transmission method according to claim 4, wherein the configuration information of the resource set includes one or more of a mapping relationship between Control Channel Elements (CCEs) and Resource Element Groups (REGs), a mapping relationship between Physical Downlink Control Channel (PDCCH) candidate resources and the CCEs, information about a Demodulation Reference Signal (DMRS) port mode, information about how many resources are occupied, and a resource offset relative to the synchronization signal block.

6. The common downlink control channel transmission method according to claim 1, wherein the configuration information of the resource set is determined through the synchronization signal block and/or predefined in a protocol.

7. The common downlink control channel transmission method according to claim 6, wherein one synchronization signal block corresponds to at least one resource set for transmitting the common downlink control channel, wherein the configuration information is indicated explicitly and/or implicitly through the MIB in the synchronization signal block, or there is a relationship predefined in a protocol between the configuration information and the synchronization signal block.

8. The common downlink control channel transmission method according to claim 7, wherein a time-frequency-domain position of the at least one resource set for transmitting the common downlink control channel corresponding to the synchronization signal block is notified through the MIB in one synchronization signal block.

9. The common downlink control channel transmission method according to claim 7, wherein one synchronization signal block corresponds to at least one time-frequency-domain position of the at least one resource set for transmitting the common downlink control channel, wherein,
one synchronization signal block is located within a same slot as the at least one resource set for transmitting the common downlink control channel corresponding to the synchronization signal block, and the at least one resource set for transmitting the common downlink control channel is located before the synchronization signal block; or
one synchronization signal block is located within a same slot as the at least one resource set for transmitting the common downlink control channel corresponding to the synchronization signal block, and the at least one resource set for transmitting the common downlink control channel is located after the synchronization signal block; or
one synchronization signal block is located within on a same OFDM symbol within a same slot as the at least one resource set for transmitting the common downlink control channel corresponding to the synchronization signal block; or
the at least one resource set for transmitting the common downlink control channel corresponding to one synchronization signal block is located within one or more slots other than a slot within which the synchronization signal block is transmitted; or
one synchronization signal block occupies a same frequency-domain resource as the at least one resource set for transmitting the common downlink control channel corresponding to the synchronization signal block.

10. The common downlink control channel transmission method according to claim 9, wherein a periodicity of the at least one resource set for transmitting the common downlink control channel corresponding to one synchronization signal block is notified through the MIB in the synchronization signal block or predefined in a protocol.

11. The common downlink control channel transmission method according to claim 6, wherein,
a beam for the transmission of the common downlink control channel is the same as a beam for the transmission of the corresponding synchronization signal block; or
a beam for the transmission of the common downlink control channel is indicated through the MIB in the corresponding synchronization signal block.

12. The common downlink control channel transmission method according to claim 6, wherein partial or all the contents in the configuration information of the resource set are indicated through the MIB in the synchronization signal block in the form of table indices, and the table indices are indices in configuration information table predefined in a protocol; or partial the contents in the configuration information are notified through the MIB in the synchronization signal block, and the remaining contents in the configuration information are predefined in a protocol.

13. The common downlink control channel transmission method according to claim 12, wherein the table indices are used to indicate combinations of partial or all contents in the configuration information, or partial or all contents in the configuration information.

14. The common downlink control channel transmission method according to claim 1, wherein the target signal is used to configure partial or all contents in the configuration information of the resource set.

15. The common downlink control channel transmission method according to claim 14, wherein the target signal includes Remaining System Information (RMSI), a message 2 in a random access process, or a message 4 in the random access process,
wherein relevant parameters of the beam for transmitting the common downlink control channel on the resource set are determined in accordance with a Quasi-Co-Location (QCL) parameter of the synchronization signal block corresponding to the resource set.

16. A user equipment (UE), comprising a processor, a transceiver, a memory, a user interface and a bus interface, wherein the processor is configured to read a program stored in the memory, so as to implement the common downlink control channel transmission method according to claim 1.

17. A common downlink control channel transmission method, comprising:
transmitting, by a network side device, a target signal to a UE, a resource set for transmitting a common downlink control channel being associated with the target signal; and
transmitting, by the network side device, the common downlink control channel to the UE through the resource set,
wherein the target signal includes a synchronization signal block,
wherein an Orthogonal Frequency Division Multiplexing (OFDM) symbol occupied by the resource set is the same as an OFDM symbol occupied by the synchronization signal block, and a transmission periodicity of the common downlink control channel is the same as a transmission periodicity of the synchronization signal block.

18. A network side device, comprising a processor, a transceiver, a memory, a user interface and a bus interface, wherein the processor is configured to read a program stored in the memory, so as to implement the common downlink control channel transmission method according to claim 17.

* * * * *